United States Patent Office 3,315,744
Patented Apr. 25, 1967

3,315,744
DUAL FUNCTION AQUEOUS SOLUTION FLOW IN PERMEABLE EARTH FORMATIONS
Peggy M. Dunlap, Dallas, Tex., assignor to Mobil Oil Corporation, a corporation of New York
No Drawing. Filed Dec. 31, 1964, Ser. No. 422,547
26 Claims. (Cl. 166—9)

This invention relates to flow of an aqueous solution in a permeable earth formation. Particularly, this invention pertains to a method of treating subterranean formations by flowing into the formations an aqueous solution. More particularly, this invention is directed to improving the recovery of petroleum, or oil, from an oil-containing subterranean formation by flowing therethrough an aqueous solution.

The oil accumulated in subterranean formations is recovered or produced therefrom through wells drilled into the subterranean formations. A large amount of the oil is left in a subterranean formation if produced only by primary depletion, i.e., by employing only initial formation energy to recover the oil. Supplemental operations, often referred to as secondary recovery operations, are used to improve the extent of recovery. In certain of these supplemental recovery operations, a fluid is injected into a well, called an injection well, and passed into the formation. Oil is displaced within and is moved through the formation, and is produced from one or more other wells, called production wells, as the injected fluid passes from the injection well toward the production wells. In a particular recovery operation of this sort, water is employed as the injected fluid and the operation is often referred to as a waterflood. The injected water is referred to as the flooding water, as distinguished from the in-situ or connate water.

Two major types of sweep efficiency, i.e., macroscopic, or areal, sweep efficiency and microscopic sweep efficiency, measure the effectiveness of the passage of the injected fluid through the formation.

The first type, the macroscopic sweep efficiency, is most seriously affected by permeability stratification of the subterranean formation and by the difference between the viscosity of the in-situ oil and the injected fluid. In any operation in which a fluid is injected through an injection well into a subterranean formation, permeability stratification is significant, and it is most significant in secondary recovery operations. By causing a disproportionately large amount of the injected fluid to enter the more permeable zones, this stratification results in premature production of the injected fluid at the production wells. The premature production is referred to as premature breakthrough and manifests itself as an increasing ratio of the injected fluid to the oil in the produced fluids. Thus, premature breakthrough can render an otherwise well-engineered recovery project relatively uneconomical because of the cost of treating and recyling the injected fluid.

Where the viscosity of the injected fluid is markedly less than the viscosity of the in-situ oil, a situation referred to as instability is created. In this situation, the less viscous injected fluid tends to develop fingers or bulges which may be caused by points of minute inhomogeneity in the formation. These fingers grow and travel at a much faster rate than the remainder of the injected fluid. Thus, they create nonuniforrm injection and flow profiles which also cause premature breakthrough.

Various means have been proposed to improve macroscopic sweep efficiency and thereby avoid premature breakthrough. Selective plugging operations have been proposed to correct permeability stratification. Viscosity gradation, wherein a liquid or liquids having a viscosity between that of the injected fluid and that of the in-situ oil is injected into the formation prior to the injected fluid, has been proposed to cure or minimize instability fingering. One metthod which has been proposed to correct both the permeability stratification and the instability fingering involves the use of a thickener in the flooding liquid. More specifically, it has been proposed to add thickeners to at least a portion of the flooding water.

The second type of sweep efficiency, the microscopic sweep efficiency, is influenced by the interfacial tension between the injected fluid and the in-situ oil; by the contact angle, i.e., the angle at which the interface between the oil and the injected fluid contacts the solid surface; and by the permeability of the formation. To achieve improved microscopic sweep efficiency of flooding water, it has been proposed to add a surfactant to the water to decrease the interfacial tension and to alter the contact angle. Available methods of altering permeability, such as fracturing or acidizing, are of limited benefit in improving microscopic sweep efficiency since they do not affect to any great extent the over-all permeability of the formation but rather create only localized flow channels of high permeability.

Despite experimental and field use of the foregoing additives and methods, much oil continues to remain in a subterranean formation after the best supplementary recovery mechanisms heretofore known have been employed.

Therefore, it is an object of this invention to provide a method of achieving more nearly uniform injection and flow profiles when treating a subterranean formation by flowing an aqueous solution therein.

It is also an object of this invention to provide a method for evening out injection and flow profiles of an aqueous solution flowed in a subterranean formation, and thus benefiting the distribution pattern of any other fluids injected concurrently, alternately, or subsequently.

It is another object of this invention to provide a method of recovering oil by passing through an oil-containing subterranean formation flooding water which has been treated to achieve increased macroscopic sweep and microscopic sweep efficiencies.

It is another object of this invention to provide a method of decreasing the flow of flooding water in more permeable zones relative to flow in less permeable zones within a subterranean formation.

Further objects and attendant advantages of this invention will be apparent from the description hereinafter.

In accordance with the invention, there is provided an improvement in a method for the treatment of a permeable subterranean formation wherein a fluid is injected into the formation through an injection well penetrating thereinto. The improvement comprises injecting water having incorporated therein an additive in a sufficient quantity to provide a solution which is viscoelastic and which is also a shear hardening, positive nonsimple liquid. The additive is either:

(1) M' alkyl aryl ether sulfonate, where

M' represents H$^+$, K$^+$, Na$^+$, NH$_4^+$, Zn$^{++}$, anilino, toluidino, sec-butylamino, or ethylamino;
alkyl represents tetradecyl, pentadecyl, hexadecyl, heptadecyl, or octadecyl; and
aryl represents o-tolyl, p-tolyl, o-ethyl phenyl, p-ethyl phenyl, o-n-propyl phenyl, or p-n-propyl phenyl;

(2) Copper alkoxy aryl sulfonate, where alkoxy represents tetradecyloxy, pentadecyloxy, heptadecyloxy, or octadecyloxy; and aryl represents phenyl, tolyl, ethyl phenyl, or n-propyl phenyl;

(3) M dialkoxy benzene sulfonate, where

M represents $H^+$, $K^+$, $Na^+$, $NH_4^+$, $Cu^{++}$, $Zn^{++}$, anilino, toluidino, sec-butylamino, or ethylamino; and dialkoxy represents two radicals, each having an oxygen linkage on an alkyl radical containing 6 to 12 carbon atoms, inclusive, and together containing a total of 14 to 18 carbon atoms, inclusive; or (4) M dialkoxy benzene disulfonate, where M represents $H^+$, $K^+$, $Na^+$, $NH_4^+$, $Cu^{++}$, $Zn^{++}$, anilino, toluidino, sec-butylamino, or ethylamino; and dialkoxy represents two radicals, each having an oxygen linkage on an alkyl radical containing 14 to 20 carbon atoms, inclusive.

The named alkyl and alkoxy radicals are used generically to include normal and branched chain isomers thereof.

It can be seen from structural Formula 1, which appears hereinafter, that M' alkyl aryl ether sulfonate is synonymous with M' alkoxy aryl sulfonate, i.e., the "alkyl aryl ether" nomenclature is equivalent to "alkoxy aryl."

In a specific aspect of the invention, in the recovery of oil from a subterranean formation by injecting a flooding liquid through an injection well and into the formation and producing oil from the formation through a production well, there is employed, as the flooding liquid, water incorporating at least one of the above additives in a sufficient quantity to provide a viscoelastic solution which is also a shear hardening, positive nonsimple liquid. The solutions containing the additive will be termed the "active solutions" hereinafter. The reasons why the solutions are so termed will later become apparent. The additives are also surfactants and lower the interfacial tension between water and hydrocarbons, or oil, as illustrated hereinafter.

A viscoelastic liquid is a liquid which possesses both elastic and viscous properties. Viscoelastic liquids have a characteristic viscosity function, which function may or may not be dependent on rate of shear or stress. They also exhibit elasticity of shape and a retarded elastic recovery in deformation. A viscoelastic liquid may be a solution comprising one or more solvents containing one or more solutes.

In laminar flow of a viscoelastic liquid, components of stress which are normal as well as tangential to the direction of the stress frequently develop and secondary flow effects appear. Thus, the normal stresses in a viscoelastic liquid flowing in a circular conduit cause an appreciable axial tension to develop. When the flowing liquid emerges from a circular conduit, the tension in the streamlines relaxes with the result that the liquid stream swells to a diameter in excess of the diameter of the opening of the conduit. Accordingly, the liquid leaving the conduit expands or bulges outwardly, forming what might be termed an enlarged bulb at the opening of the conduit.

Another characteristic of a viscoelastic liquid is its flow behavior between concentric cylinders having relative rotation with respect to each other. Analysis of the complete spatial distribution of stress for a viscoelastic liquid in this situation shows that the primary phenomenon is the appearance of an additional tension along the streamlines. Between the concentric cylinders at least one of which is rotating, the streamlines are circles and the tension becomes a hoop or strangulation stress which constricts the liquid toward the axis of rotation. As a consequence, the liquid tends to climb the inner cylinder and a pronounced thrust develops.

Further with respect to the characteristics of a viscoelastic liquid, it can be shown by theoretical analysis that flow in rectilinear paths through conduits of arbitrary cross section under a constant pressure gradient is not always possible for certain of these liquids. Thus, if the flow conduit is noncylindrical, superimposed onto the simple rectilinear motion is a steady motion in which liquid particles follow spiral paths to develop a vortexlike motion.

Each of the properties of a viscoelastic liquid described above is of value in displacing oil from a subterranean formation. Flow of the liquid through the interstices of a subterranean formation will ordinarily be laminar. Thus, with the development of axial tension of the viscoelastic liquid upon flow from restraining portions of substantially circular interstices, or conduits, within the formation, the resulting bulging effect enables the viscoelastic liquid to displace the oil from adjacent wider portions of the interstices. The development of tension along the streamlines of flow of the viscoelastic liquid and the development of thrust by the liquid will additionally effect displacement of the oil otherwise trapped within the interstices of the formation. Furthermore, the development of vortexlike motion in the flow of the viscoelastic liquid in noncircular interstices effects a thorough displacing action by the viscoelastic liquid of the oil from the interstices.

As the name implies, a shear hardening liquid is a liquid which hardens, i.e., develops a higher viscosity, when subjected to certain rates of shear. The property of shear hardening thus enables such a liquid to develop a higher viscosity when subjected to a higher rate of shear in a subterranean formation. Such a higher rate of shear is induced in a liquid when it flows in a more permeable stratum than when it flows in parallel, i.e., under the influence of the same pressure drop, in a less permeable stratum within a subterranean formation. A shear hardening liquid thus is active in that it becomes selectively more viscous in the more permeable strata than in the less permeable strata. As a result, the rates of flow of the liquid in the more permeable and in the less permeable strata become more nearly equalized and premature breakthrough is lessened.

A positive nonsimple liquid is a liquid which has a higher viscosity when it flows in a more permeable stratum than when it flows at the same nominal rate of shear in a less permeable stratum. A positive nonsimple liquid thus is active in the sense that it adjusts its properties to flow at a rate which is relatively insensitive to the permeability of the various strata within a subterranean formation through which it is flowing. This phenomenon differs from that of shear hardening in that the positive nonsimple liquid increases in viscosity in the more permeable strata through which it is flowing even at equal rates of shear. Permeability controls whether a flowing positive nonsimple liquid becomes more viscous or not, whereas shear rate controls whether a flowing shear hardening liquid becomes more viscous or not. Both phenomena operate to achieve more nearly uniform injection and flow profiles of a shear hardening, positive nonsimple liquid passing through a subterranean formation.

The active solutions employed in the method of the invention exhibit the properties of viscoelasticity, shear hardening, and positive nonsimplicity. Through the properties of shear hardening and positive nonsimplicity, they improve the macroscopic sweep efficiency and thus enable the recovery of a greater portion of the oil from a subterranean formation before they break through at a production well. Since the active solutions are also viscoelastic, they improve the microscopic sweep efficiency as they pass through the subterranean formation.

Whether a particular solution exhibits the property of viscoelasticity or not can be determined by one of many well-known tests. If a solution exhibits the previously described properties, e.g., (1) swelling to a diameter in excess of the diameter of the conduit upon emerging therefrom or (2) climbing an immersed cylinder having rotational motion with respect thereto, it is viscoelastic. Further tests for determining whether a liquid is viscoelastic or not may be found in a number of published books discussing the phenomenon, e.g. Viscoelastic Properties of Polymers, J. D. Ferry, Wiley Publishing Company, New York, 1961.

Whether a particular liquid exhibits the properties of shear hardening or positive nonsimplicity can be determined from its behavior in a rotational viscometer, such as a Couette-type viscometer. The viscosity of the liquid, measured as a function of the rate of shear on such a rotational viscometer at different gap sizes, indicates the existence of each of the properties. The gap size in such a viscometer is the distance separating the concentric cylinder walls immersed in the liquid whose viscosity is being measured. The curve which results from plotting the data obtained on the viscometer, e.g., plotting the viscosity as the ordinate against the shear rate as the abscissa, depicts the properties of shear hardening or positive nonsimplicity. With a solution, if the curve representing the viscosity of the solution increases with increasing shear rates within a certain range of shear rates, the solution is a shear hardening liquid. If the viscosity of the solution is higher when measured in a larger gap size at the same shear rate, the solution is a positive nonsimple liquid. Further, with solutions exhibiting the properties of shear hardening and positive nonsimplicity, the relative quantitative activity of the solution is measured by the area between the curve representing the viscosity response of the solvent and the curve representing the viscosity response of the solution at an arbitrarily chosen gap size. One useful gap size is 0.123 centimeter between concentric cylinders having radii of 1.257 and 1.380 centimeters on a U.L. Adapter of a Brookfield Model LVT Synchro-Lectric Viscometer having variable rate of rotation.

The properties of shear hardening and positive nonsimplicity also can be determined by flowing a liquid through models or core samples of subterranean formations having different permeabilities. The pressure drop at a known flow rate may be measured and the viscosity calculated therefrom. By taking measurements over a range of flow rates, the solution flow properties may be characterized as a function of permeability and shear rate. Such determinations carried out in models or core samples are time consuming, and the use of a rotational viscometer is preferred to delineate liquids having the properties of shear hardening and positive nonsimplicity.

In the practice of the invention, the requisite concentration, as discussed hereinafter, of the particular additive is incorporated into water to form the active solution.

The term "water" is used herein to include dilute aqueous solutions such as surface water, well water, rain water, city water, treated waste water, and suitable oil field brines. Where brines are employed to prepare the active solution, the concentration of sodium chloride therein may be limited with certain of the additives, as discussed more fully hereinafter. The term "additive" is used hereinafter and in the claims to include a particular compound either alone or in admixture with other suitable compounds.

The additives are prepared essentially as described by G. S. Hartley in his "Sulfonates of Higher Alkyl Phenolic Ethers," Journal of the Chemical Society, pages 1828 to 1834, in 1939. The steps are enumerated below.

(1) The alkyl ether of the aryl compound is prepared by reacting the appropriate alkyl halide with the appropriate phenol, or diphenol.

(2) The alkoxy aryl sulfonic acid is prepared by sulfonating the alkyl ether of the aryl compound with a suitable sulfonation agent. Concentrated sulfuric acid may be employed as the sulfonation agent for monosulfonation. If faster or more severe sulfonation is desired, stronger sulfonating agents such as oleum, chlorosulfonic acid, or $SO_3$ should be used to carry out the sulfonation.

(3) The desired M alkoxy aryl sulfonate is prepared by reacting the alkoxy aryl sulfonic acid with the appropriate cation donor. For example, sodium hydroxide or sec-butylamine may be reacted with the alkoxy aryl sulfonic acid in an aqueous medium to provide, respectively, sodium alkoxy aryl sulfonate or sec-butylamino alkoxy aryl sulfonate.

One molecular configuration of the M' alkyl aryl ether sulfonate is illustrated in structural Formula 1 below:

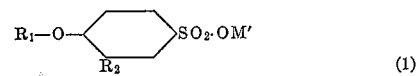

(1)

where

M' represents one of the hereinbefore designated cations;
$R_1$ represents one of the hereinbefore designated alkyl radicals containing 14 to 18 carbon atoms, inclusive; and
$R_2$ represents a different alkyl radical which is a methyl, an ethyl, or a n-propyl radical. Formula 1 illustrates a configuration wherein aryl represents an o-alkyl substituted phenyl radical. When aryl represents a p-alkyl substituted phenyl radical, the configuration is altered and the alkyl radical, $-R_2$, is substituted in the para position and the sulfonate radical, $-SO_2 \cdot OM'$, is substituted in the ortho position, the positions being named with respect to the alkoxy radical, $-OR_1$, on the phenyl ring.

Of the M' alkyl aryl ether sulfonates, it is preferable to employ one wherein alkyl represents hexadecyl since the greatest activity per unit concentration is achieved therewith. Further, it is preferable to employ an M' alkyl aryl ether sulfonate wherein aryl represents o-tolyl.

Additives illustrative of the M' alkyl aryl ether sulfonates include the sec-butylamino salts of the various sulfonic acids, e.g., sec-butylamino tetradecyl o-tolyl ether sulfonate, sec-butylamino tetradecyl p-tolyl ether sulfonate, sec-butylamino pentadecyl o-tolyl ether sulfonate, sec-butylamino pentadecyl p-tolyl ether sulfonate, sec-butylamino hexadecyl o-tolyl ether sulfonate, sec-butylamino hexadecyl p-tolyl ether sulfonate, sec-butylamino heptadecyl o-tolyl ether sulfonate, sec-butylamino heptadecyl p-tolyl ether sulfonate, sec-butylamino octadecyl o-tolyl ether sulfonate, and sec-butylamino octadecyl p-tolyl ether sulfonate. Other cations represented by M' may be substituted for the sec-butylamino cation, and the resulting salt forms an additive suitable for use in creating the active solutions. While the acid form, i.e., using $H^+$ as the cation, may be employed in creating the active solutions, the resulting solutions react with any basic constituents of a subterranean formation into which they are injected and therefore are employed only in special noncalcareous, siliceous-type subterranean formations.

Other additives include, for example, potassium hexadecyl p-tolyl ether sulfonate, potassium hexadecyl o-tolyl ether sulfonate, sodium hexadecyl p-tolyl ether sulfonate, sodium hexadecyl o-tolyl ether sulfonate, ammonium hexadecyl p-tolyl ether sulfonate, ammonium hexadecyl o-tolyl ether sulfonate, anilino hexadecyl o-tolyl ether sulfonate, anilino hexadecyl p-tolyl ether sulfonate, ethylamino hexadecyl o-tolyl ether sulfonate, ethylamino hexadecyl p-tolyl ether sulfonate, toluidino hexadecyl p-tolyl ether sulfonate, and toluidino hexadecyl o-tolyl ether sulfonate.

Other suitable additives which have similar molecular structure are copper tetradecyloxy aryl sulfonate, copper pentadecyloxy aryl sulfonate, copper heptadecyloxy aryl sulfonate, and copper octadecyloxy aryl sulfonate. Aryl represents phenyl, o-tolyl, p-tolyl, m-tolyl, o-ethyl phenyl, p-ethyl phenyl, m-ethyl phenyl, o-n-propyl phenyl, p-n-propyl phenyl or m-n-propyl phenyl in these additives. Of these copper salts, it is preferable to employ the additive wherein aryl represents o-tolyl.

The molecular structure of the M dialkoxy benzene sulfonate is illustrated in structural formula (2) below:

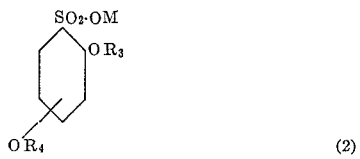

(2)

where

M represents the hereinbefore designated cations; and
$R_3$ and $R_4$ represent alkyl groups containing 6 to 12 carbon atoms each, inclusive.

$R_3$ may or may not be the same as $R_4$, as discussed more fully hereinafter; however, the total number of carbon atoms included in $R_3+R_4$ should be between 14 and 18 carbon atoms inclusive. The numbering of carbon atoms in the phenyl ring is made with respect to the sulfonate group being on carbon atom number 1. Thus, as illustrated in Formula 2, one alkoxy group, $-OR_3$, is substituted in the 2 position, and the second alkoxy group, $-OR_4$, is substituted in the 4 or 5 position. In the preparation of the M dialkoxy benzene sulfonate, the appropriate diphenol is selected as one of the reactants to control the position of the second alkoxy group. For example, resorcinol is selected as the diphenol comprising one of the initial reactants in the preparation of an M 2,4-dialkoxy benzene sulfonate. Conversely, hydroquinone is selected as the diphenol comprising one of the initial reactants in the preparation of an M 2,5-dialkoxy benzene sulfonate.

Generally, the M dialkoxy benzene sulfonates behave in a manner similar to the alkyl aryl ether sulfonates. Based on the total number of carbon atoms in the molecule, the M dialkoxy benzene sulfonates produce positive nonsimple aqueous solutions at lower temperatures and produce lower interfacial tensions with respect to hydrocarbon solutions than do the alkyl aryl ether sulfonates having the same number of carbon atoms in the molecule.

Within the M dialkoxy benzene sulfonates, however, there is a subgroup of additives which is peculiarly more effective. The molecule structure of this subgroup is illustrated in structural formula 3 below:

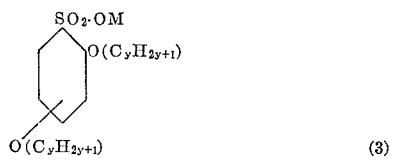

(3)

where $y$ represents 7 to 9, inclusive.

Within this subgroup, when the alkoxy groups are substituted in the 2,4-position with respect to the sulfonate group on the phenyl ring, the resulting M 2,4-dialkoxy benzene sulfonate may be employed to create an aqueous solution which has a greatly reduced interfacial tension against hydrocarbons but no enhanced activity in the active solution. This is illustrated by the data hereinafter. Conversely, when the alkoxy groups are substituted in the 2,5-position with respect to the sulfonate group on the phenyl ring, the resulting M 2,5-dialkoxy benzene sulfonate induces enhanced activity to an aqueous solution to which it is added, resulting in a peculiarly more active solution. Thus, by using a mixture of the 2,4- and 2,5-substituted dialkoxy benzene sulfonates, it is possible to tailor the active solution to achieve both an extremely active solution and an extremely low interfacial tension with the hydrocarbon. This is discussed more fully hereinafter.

The M dialkoxy benzene sulfonates wherein the alkyl groups contain the same number of carbon atoms are easily prepared since only one alkyl halide need be reacted with the appropriate diphenol in their preparation.

Thus, these M dialkoxy benzene sulfonates form a preferred subgroup of additives for use in the method of the invention.

Additives illustrative of the M dialkoxy benzene sulfonates include the sec-butylamine salts of the various sulfonic acids, e.g., sec-butylamino 2-octyloxy-4-nonyloxy benzene sulfonate, sec-butylamino 2-octyloxy-5-nonyloxy benzene sulfonate, sec-butylamino 2-nonyloxy-4-octyloxy bezene sulfnoate, sec-butylamino 2-nonyloxy-5-octyloxy benzene sulfonate, sec-butylamino 2-heptyloxy-4-decyloxy benzene sulfonate, sec-butylamino 2-heptyloxy-5-decyloxy benzene sulfonate, sec-butylamino 2-decyloxy-4-heptyloxy benzene sulfonate, sec-butylamino 2-decyloxy-5-heptyloxy benzene sulfonate, sec-butylamino 2-hexyloxy-4-undecyloxy benzene sulfonate, sec-butylamino 2-hexyloxy-5-undecyloxy benzene sulfonate, sec-butylamino 2-undecyloxy-4-hexyloxy benzene sulfonate, and sec-butylamino 2-undecyloxy-5-hexyloxxy benzene sulfonate.

Other cations represented by M may be substituted for the sec-butylamino cation, and the resulting salt forms an additive suitable for use in creating the active solutions. While the acid form, i.e., using H+ as the cation, may be employed in creating active solutions, the resulting solutions react with any basic constituents of a subterranean formation into which they are injected. Therefore, they are employed only in special non-calcareous, siliceous-type subterranean formations.

Suitable additives which illustrate the substitution of other cations and also illustrate additives wherein the alkyl groups contain the same number of carbon atoms include, for example, sodium 2,4-dioctyloxy benzene sulfonate; sodium 2,5-dioctyloxy benzene sulfonate; sodium 2,4-dinonyloxy benzene sulfonate; sodium 2,5-dinonyloxy benzene sulfonate; potassium 2,4-dioctyloxy benzene sulfonate; potassium 2,5-dioctyloxy benzene sulfonate, potassium 2,4-dinonyloxy benzene sulfonate; potassium 2,5-dinonyloxy benzene sulfonate; ammonium 2,4-dioctyloxy benzene sulfonate; ammonium 2,5-dioctyloxy benzene sulfonate; ammonium 2,4-dinonyloxy benzene sulfonate; ammonium 2,5-dinonyloxy benzene sulfonate; copper 2,4-dioctyloxy benzene sulfonate; copper 2,5-dioctyloxy benzene sulfonate; copper 2,4-dinonyloxy benzene sulfonate; copper 2,5-dinonyloxy benzene sulfonate; anilino 2,4-dioctyloxy benzene sulfonate; anilino 2,5-dioctyloxy benzene sulfonate; anilino 2,4-dinonyloxy bezene sulfonate; anilino 2,5-dinonyloxy benzene sulfonate; toluidino 2,4-dioctyloxy benzene sulfonate; toluidino 2,5-dioctyloxy benzene sulfonate; toluidino 2,4-dinonyloxy benzene sulfonate; toluidino 2,5-dinonyloxy benzene sulfonate; sec-butylamino 2,4-dioctyloxy benzene sulfonate; sec-butylamino 2,5-dioctyloxy benzene sulfonate; sec-butylamino 2,4-dinonyloxy benzene sulfonate; sec-butylamino 2,5-dinonyloxy benzene sulfonate; ethylamino 2,4-dioctyloxy benzene sulfonate; ethylamino 2,5-dioctyloxy benzene sulfonate; ethylamino 2,4-dinonyloxy benzene sulfonate; and ethylamino 2,5-dinonyloxy benzene sulfonate. The diheptyloxy equivalents of the above-named benzene sulfonates are also suitable for use in creating an active solution.

The molecular structure of the M dialkoxy benzene disulfonate is illustrated in structural Formula 4 below:

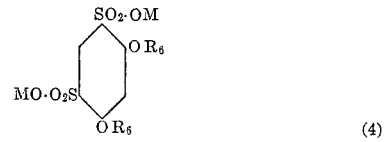

(4)

where

M represents the hereinbefore designated cations; and
$R_5$ and $R_6$ represent alkyl groups containing 14 to 20 carbon atoms each, inclusive.

The M dialkoxy benzene disulfonates are prepared as discussed above except the sulfonation is carried out under more severe conditions to achieve disulfonation. That is, the stronger sulfonating agents, such as oleum, chlorosulfonic acid, or sulfur trioxide, are used to disulfonate the dialkoxy benzene. The resulting disulfonated dialkoxy benzenes are more soluble in water than are the monosulfonated dialkoxy benzenes. Hence, the dialkoxy benzene disulfonates are useful to form active solutions for waterflooding shallow, relatively low temperature formations. In addition, the disulfonated dialkoxy benzenes remain active in the presence of more concentrated brines than do the monosulfonated dialkoxy benzenes as discussed hereinafter. Hence, the M dialkoxy benzene sulfonates are employed where such more concentrated brines are either native to the formation or will be used as the flooding water.

Suitable M dialkoxy benzene disulfonates include sec-butylamino 2,4-ditetradecyloxy benzene 1,5-disulfonate; sec-butylamino 2,4-dipentadecyloxy benzene 1,5-disulfonate; sec-butylamino 2,4-dihexadecyloxy benzene 1,5-disulfonate; sec-butylamino 2,4-diheptadecyloxy benzene 1,5-disulfonate; sec-butylamino 2,4-dioctadecyloxy benzene 1,5-disulfonate; and sec-butylamino 2,4-dinonadecyloxy benzene 1,5-disulfonate. Any alkoxy groups may be substituted in either the 2 or the 4 position with any other of the alkoxy groups in the other of the 4 or 2 positions. For example, sec-butylamino 2-tetradecyloxy-4-octadecyloxy benzene 1,5-disulfonate or sec-butylamino 2-octadecyloxy-4-hexadecyloxy benzene 1,5-disulfonate are suitable additives. The other cations represented by M may be substituted for the sec-butylamino cation in the above-named salts, and the resulting compounds may also be employed in preparing the active solutions.

The additives are employed in the active solutions in an amount sufficient to convert the water to which they are added into a solution which is viscoelastic and which is a shear hardening, positive nonsimple liquid. This amount can be determined empircally for each reservoir and for the fluids, particularly the oil and the aqueous liquids, contained therein. The following guidelines have been found helpful in preparing the active solutions under varied conditions. Generally, a concentration of the additive of at least 0.001 percent by weight is required. The maximum concentration of the additive which is employed is limited by the solubility of the additive in the aqueous solution, by the temperature at which the active solution is to be employed, and by the viscosity which is desired. When the solution becomes saturated with the additive at the temperature at which it will be employed, the upper limit of concentration has been reached. Generally, this upper limit of concentration will not exceed 5.0 percent by weight. Certain additives, however, form extremely viscous solutions resembling gels at such high concentrations. Hence, the viscosity limitations, which the permeability of the formation necessarily imposes on a fluid to be injected therein, afford a maximum limit to the concentration of additives which may be employed. In general, higher temperature environments will require higher concentrations of the additive to form active solutions. Concentrations which form gel-like solutions at room temperature may become active solutions at elevated temperatures such as encountered in deeper subterranean formations. Preferably, a concentration of from 0.01 to 1.0 percent by weight of the additive is employed in the active solution. However, concentrations of from 2.0 to 5.0 percent by weight may be required in certain high temperature subterranean formations wherein low salinity floodwaters are used or may be encountered in the formations.

As mentioned earlier, a brine or other solution of strong electrolyte may be employed in conjunction with the additives. The presence of a strong electrolyte, such as sodium chloride, in a concentration of from 0.01 to 2.0 percent by weight generally enhances both the lowering of the interfacial tension and the activity of the active solution. Hence, commonly available oil field brines are beneficial.

The concentration of the sodium chloride within this range of from 0.01 to 2.0 percent by weight, as well as the concentration of the particular additive, can be varied to help achieve a desired degree of activity. For example, increasing the concentration of sodium chloride increases the degree of activity of the solution within an upper limit discussed hereinafter. Particularly, the initial increase in concentration going from 0 to some small concentration enables obtaining the same relative activity with a much lower concentration of additive. For example, the sodium or potassium salts of the additives require a concentration toward the upper end of the scale, i.e., 3 to 5 weight percent, to form solutions having appreciable activity in the absence of an electrolyte, such as sodium chloride. However, the presence of as little as 0.01 weight percent sodium chloride reduces the concentration of the sodium or potassium salts of these additives required to form active solutions to less than 1.0 weight percent.

The upper limit of concentration of strong electrolyte is the concentration at which the additive begins to precipitate from solution because of the decreased solubility, commonly referred to as the salting-out effect. The upper limit varies with the additive and with the temperature of the solution. However, of the additives, only the M dialkoxy disulfonates should be employed in the presence of greater than about 2 percent by weight of sodium chloride in the water from which the active solution is to be prepared.

Mixtures of the additives are equally as effective as the relatively pure additives in forming the active solutions. The additives are also mutually compatible. Therefore, mixtures of the additives may be employed in forming the active solutions. Alternatively, mixtures of active solutions may be employed to create a resulting shear hardening, positive nonsimple flooding liquid that is more nearly ideally suited to a particular formation and the fluids it contains.

Tailoring of the composition of the active solution by employing a mixture of additives to optimize recovery from a particular formation may be effected. In formations known to have significant permeability variations, it is preferable to use an M 2,5-dialkoxy benzene sulfonate having alkyl chains containing an equal number of carbon atoms between 7 and 9, inclusive. These additives can convert the water into a more active solution than does the equivalent M 2,4-dialkoxy benzene sulfonate. Conversely, in a relatively impermeable formation having very little permeability variation, it is preferable to use the M 2,4-dialkoxy benzene sulfonate since somewhat lower interfacial tensions are obtainable between the active solution and the in-situ oil than is afforded with an active solution formed with the M 2,5-dialkoxy benzene sulfonate. It can be advantageous to use mixtures having the proper proportions, as determined, for example, from empirical flooding experiments on core samples, of the M 2,5-dialkoxy benzene sulfonate and of the M 2,4-dialkoxy benzene sulfonate to achieve the desired properties for the flooding liquid. In this manner, more nearly complete flushing of all of the oil from the subterranean formation can be realized.

The additives are useful at a pH range between about 4.5 and about 11. Thus, they can be used in almost any subterranean formation without concern for pH variations.

Specific additives may be chosen for employment in almost any temperature environment, ranging from 25° to 100° C. Illustrative temperatures at which the additives are effective are shown in Tables I, II, and III.

Where a formation is to be treated by injecting floodwater into the formation, the particular additive employed may be incorporated in only a portion of the flooding water to create a slug or slugs of active solution. The slug should have a volume of from 0.1 to 30 percent of the pore volume of the formation. Preferably, the slug will have a volume of 1 to 10 percent of the pore volume of the formation. The slug of active solution is injected through the injection well and passed into the formation. The slug may be driven into the formation by injecting behind it a driving fluid such as water or natural gas. Such a slug may be injected only once or may be injected alternately with at least equal volumes of driving fluid, e.g., preferably untreated water, between alternate slugs of active solution to achieve the desired recovery of oil from the subterranean formation. Instead of untreated water, water having lower concentration of the additive than the concentration of additive in the slug and hence less activity as a shear hardening, positive nonsimple liquid, may be used between alternate slugs of active solution. Each slug of active solution tends to even out the flow, to alter the pressure gradients, and more nearly to compensate for permeability stratification in the formation. Hence, the greater the number of treated slugs the more effective will be the flood. This is, of course, more expensive and the particular formation will dictate the economics of the amount and the frequency of the slugs which are to be injected, ranging from only one slug to treating all of the flooding water.

It is possible to precipitate a calcium or magnesium salt of the additive, as, for example, calcium dialkoxy benzene sulfonate, if the active solutions employed in the invention come in contact with formation liquids containing calcium or magnesium ions. It is preferred to take steps to prevent such precipitation.

One way to prevent such precipitation is to inject a slug of from 0.01 to 10 percent of the pore volume of water in advance of the active solution. The water will build up a bank and miscibly displace the aqueous formation liquids containing the calcium or magnesium ions, thus preventing contact of the active solution with the aqueous formation liquids.

Another way to prevent such precipitation is to incorporate into the active solution a chelating or sequestering agent, such as tetrasodium salt of ethylenediaminetetraacetic acid, sold commercially as sodium Versenate, or sodium phosphate glass, commonly called sodium hexametaphosphate and sold commercially as Calgon. The chelating agents are also strong electrolytes. Therefore, the total concentration of chelating agent and other strong electrolytes should not exceed the limitations discussed hereinbefore. The amount of chelating agent should be at least 0.1 percent by weight. Generally, the amount of chelating agent employed is less than about 1.7 percent by weight. Alternatively, a slug of from 0.01 to 1.0 percent of the pore volume of an aqueous solution of the chelating agent may be injected into the formation ahead of the active solution.

If desired, both ways of preventing precipitation of calcium or magnesium salts of the additive may be combined. Thus, a slug of water may be injected into the injection well and passed into the formation, followed by a slug of aqueous solution containing the chelating agent, prior to the active solution. If the active solution is injected in a slug following the slug of water and the slug of chelating agent in solution, it will be passed through the formation by injecting thereafter a driving fluid such as water. In the event that subsequent slugs of active solutions are injected, it is unnecessary to inject the chelating agent or a separate slug of fresh water in advance of such subsequent slugs of active solution.

Table I outlines some concentrations, temperatures, and interfacial tensions of typical active solutions. The interfacial tension data were obtained for the active solution against hexadecane at 25° C. The usual interfacial tension of water against hexadecane is about 50 dynes per centimeter. The operable temperatures shown in Table I are the temperature(s) at which data have been obtained and activity is known to exist for the particular concentrations of additive and sodium chloride being tested. There is always a range of at least a few degrees within which the particular concentrations remain active. Thus, the temperatures given are exemplary, not exclusive.

TABLE 1

| Additive | Interfacial Tension, dynes/cm. | Concentration, wt. percent | Sodium Chloride Concentration, wt. percent | Operable Temperature, ° C. |
|---|---|---|---|---|
| Hexadecyl o-tolyl ether sulfonic acid | | 0.1 | | >28 |
| Potassium hexadecyl o-tolyl ether sulfonate | 1.12 | 0.1 | | 25 |
| Do | | <1.0 | | >43 |
| Sodium pentadecyl o-tolyl ether sulfonate | 3.9 | 0.1 | | 39 |
| Do | 0.59 | 0.1 | 0.5 | 56 |
| Do | 0.34 | 0.1 | 1.0 | 53 |
| Sodium hexadecyl o-tolyl ether sulfonate | 5.0 | 0.01 | | 25 |
| Do | 2.7 | 0.01 | 0.1 | 25 |
| Do | 1.4 | 0.01 | | 53 |
| Do | | 0.1 | 0.2 | 45–60 |
| Do | | 0.5 | 0.25 | 45–60 |
| Do | 1.3 | 1.0 | | >53 |
| Sodium heptadecyl o-tolyl ether sulfonate | 1.05 | 0.1 | | 56 |
| Do | 0.72 | 0.1 | 0.2 | 63 |
| Do | 0.39 | 0.1 | 0.5 | 64 |
| Sodium octadecyl o-tolyl ether sulfonate | 5.0 | 0.01 | 0.1 | 25 |
| Copper octadecyloxy phenyl sulfonate | | 1.0 | | 72–100 |

Table II shows some compartive interfacial tensions for additives illustrative of different group and subgroup, along with the effect of concentration (conc.) and of addition of sodium chloride. The interfacial tension was obtained in dynes per centimeter at 25° C., against hexadecane as in Table I.

TABLE II

| Additive | Conc., wt. Percent | NaCl Conc., wt. Percent | Interfacial Tension, dyne/cm. |
|---|---|---|---|
| Sodium hexadecyl p-tolyl ether sulfonate | 0.01 | | 3.2 |
| Do | 0.01 | 0.1 | 0.38 |
| Do | 0.1 | | 3.1 |
| Do | 0.1 | 0.1 | 0.38 |
| Potassium 2,4-dioctyloxy benzene sulfonate | 0.01 | | 1.46 |
| Do | 0.01 | 0.1 | 0.11 |
| Do | 0.1 | | 0.84 |
| Do | 0.1 | 0.1 | 0.097 |

Table III shows comparative interfacial tensions between active solutions of 2,4-dialkoxy benzene sulfonate and of 2,5-dialkoxy benzene sulfonate when measured against hexadecane. The potassium 2,5-diactyloxy benzene sulfonate, 1 percent solution, exhibited unusual rheological properties. It started out shear thinning at very low shear rates and then exhibited the usual shear hardening behavior as the rates of shear were increased.

TABLE III

| Additive | Concentration, wt. percent | Sodium Chloride, wt. percent | Interfacial Tension, dyne/cm. | Temperature, °C. |
| --- | --- | --- | --- | --- |
| Potassium 2,4-dioctyloxy benzene sulfonate | 0.1 | | 0.84 | 25 |
| Do | 0.01 | 0.1 | 0.11 | 25 |
| Do | 0.05 | 0.5 | 0.082 / 0.024 | 25 |
| Potassium 2,5-dioctyloxy benzene sulfonate | 1.0 | | | 25 |
| Do | 0.1 | | 0.97 | 25 |
| Do | 0.01 | 0.1 | 0.85 | 25 |

The invention provides a method of achieving more nearly uniform injection and flow profiles when flowing a liquid in a subterranean formation. The invention has been particularly described for use in secondary recovery of oil from subterranean formations. The invention serves to reduce interfacial tensions with most crude oils. Thus, at the high injection velocities which occur in the vicinity of the injection well in secondary recovery operations, the in-situ crude oil is displaced from the interstices of the formation thereabout. This results in less liquid blocking of the formation adjacent the injection well.

While the invention has been described particularly in connection with the recovery of oil from a subterranean formation by displacement of the oil therein, it will be understood that the invention is also applicable to other operations carried out in a subterranean formation. For example, a subterranean formation may be treated by the injection, and flow, therein of a positive nonsimple liquid for fracturing of the formation. Further, a subterranean formation may be treated by the injection, and flow, therein of a positive nonsimple liquid in conjunction with a solvent whereby said solvent more uniformly dissolves solid matter from the subterranean formation.

Having thus described my invention, it will be understood that such description has been given by way of illustration and example and not by way of limitation, reference for the latter purpose being had to the appended claims.

What is claimed is:

1. In a method for the treatment of a subterranean formation by injecting a fluid thereinto, the improvement comprising injecting into said formation an active solution comprising water having incorporated therein sufficient quantity of at least one additive to provide a solution which is viscoelastic and which is also a shear hardening, positive nonsimple liquid, said additive being selected from the class consisting of:
  (a) M' alkyl aryl ether sulfonate,
    where
      M' represents a cation selected from the class consisting of $H^+$, $K^+$, $Na^+$, $NH_4^+$, $Zn^{++}$, anilino, toludino, sec-butylamino, and ethylamino;
      alkyl represents an alkane radical containing 14 to 18 carbon atoms, inclusive; and
      aryl represents an aromatic radical selected from the class consisting of o-tolyl, p-tolyl, o-ethyl phenyl, p-ethyl phenyl, o-n-propyl phenyl, and p-n-propyl phenyl;
  (b) copper alkoxy aryl sulfonate,
    where
      alkoxy represents a radical selected from the class consisting of tetradecyloxy, pentadecyloxy, heptadecyloxy, and octadecyloxy; and
      aryl represents an aromatic radical selected from the class consisting of phenyl, tolyl, ethyl phenyl, and n-propyl phenyl;
  (c) M dialkoxy benzene sulfonate,
    where
      M represents a cation selected from the class consisting of $H^+$, $K^+$, $Na^+$, $NH_4^+$, $Cu^{++}$, $Zn^{++}$, anilino, toluidino, sec-butylamino, and ethylamino; and
      dialkoxy represents two radicals, each having an oxygen linkage on an alkyl radical containing 6 to 12 carbon atoms, inclusive, and together containing a total of 14 to 18 carbon atoms, inclusive; and
  (d) M dialkoxy benzene disulfonate,
    where
      M represents a cation selected from the class consisting of $H^+$, $K^+$, $Na^+$, $NH_4^+$, $Cu^{++}$, $Zn^{++}$, anilino, toluidino, sec-butylamino, and ethylamino; and
      dialkoxy represents two radicals, each having an oxygen linkage on an alkyl radical containing 14 to 20 carbon atoms, inclusive.

2. In a method for the recovery of oil from an oil-containing subterranean formation by injecting a flooding liquid through an injection well into said formation and producing oil from said formation through a production well, the improvement comprising injecting into said formation an active solution comprising water and sufficient quantity of at least one additive to provide a solution which is viscoelastic and which is also a shear hardening, positive nonsimple liquid, said additive being selected from the class consisting of:
  (a) M' alkyl aryl ether sulfonate,
    where
      M' represents a cation selected from the class consisting of $H^+$, $K^+$, $Na^+$, $NH_4^+$, $Zn^{++}$, anilino, toluidino, sec-butylamino, and ethylamino;
      alkyl represents an alkane radical containing 14 to 18 carbon atoms, inclusive; and
      aryl represents an aromatic radical selected from the class consisting of o-tolyl, p-tolyl, o-ethyl phenyl, p-ethyl phenyl, o-n-propylphenyl, and p-n-propyl phenyl;
  (b) copper alkoxy aryl sulfonate,
    where
      alkoxy represents a radical selected from the class consisting of tetradecyloxy, pentadecyloxy, heptadecyloxy, and octadecyloxy; and
      aryl represents an aromatic radical selected from the class consisting of phenyl, tolyl, ethyl phenyl, and n-propyl phenyl;
  (c) M dialkoxy benzene sulfonate,
    where
      M represents a cation selected from the class consisting of $H^+$, $K^+$, $Na^+$, $NH_4^+$, $Cu^{++}$, $Zn^{++}$, anilino, toluidino, sec-butylamino, and ethylamino;
      dialkoxy represents two radicals, each having an oxygen linkage on an alkyl radical containing 6 to 12 carbon atoms, inclusive, and together containing a total of 14 to 18 carbon atoms, inclusive; and
  (d) M dialkoxy benzene disulfonate,
    where
      M represents a cation selected from the class consisting of $H^+$, $K^+$, $Na^+$, $NH_4^+$, $Cu^{++}$, $Zn^{++}$, anilino, toluidino, sec-butylamino, and ethylamino; and
      dialkoxy represents two radicals, each having an oxygen linkage on an alkyl radical containing 14 to 20 carbon atoms, inclusive.

3. The method of claim 2 wherein said additive is copper alkoxy aryl sulfonate, where:

alkoxy represents a radical selected from the class consisting of tetradecyloxy, pentadecyloxy, heptadecyloxy, and octadecyloxy; and aryl represents an aromatic radical selected from the class consisting of phenyl, tolyl, ethyl phenyl, and n-propyl phenyl.

4. The method of claim 3 wherein said copper alkoxy aryl sulfonate is in a concentration of from 0.001 to 5.0 percent by weight.

5. The method of claim 3 wherein said copper alkoxy aryl sulfonate is in a concentration of from 0.01 to 1.0 percent by weight.

6. The method of claim 2 wherein said additive is M dialkoxy benzene sulfonate, where:

M represents a cation selected from the class consisting of $H^+$, $K^+$, $Na^+$, $NH_4^+$, $Cu^{++}$, $Zn^{++}$, anilino, toluidino, sec-butylamino, and ethylamino; and dialkoxy represents two radicals, each having an oxygen linkage on an alkyl radical containing 6 to 12 carbon atoms, inclusive, and together containing a total of 14 to 18 carbon atoms, inclusive.

7. The method of claim 2 wherein said additive is M dialkoxy benzene disulfonate, where:

M represents a cation selected from the class consisting of $H^+$, $K^+$, $Na^+$, $NH_4^+$, $Cu^{++}$, $Zn^{++}$, anilino, toluidino, sec-butylamino, and ethylamino; and dialkoxy represents two radicals, each having an oxygen linkage on an alkyl radical containing 14 to 20 carbon atoms, inclusive.

8. In a method for the recovery of oil from an oil-containing subterranean formation by injecting a flooding liquid through an injection well into said formation and producing oil from said formation through a production well, the improvement comprising injecting into said formation an active solution comprising water and sufficient quantity to provide a solution which is viscoelastic and which is also a shear hardening, positive non-simple liquid of at least one M' alkyl aryl ether sulfonate, where:

M' represents a cation selected from the class consisting of $H^+$, $K^+$, $Na^+$, $NH_4^+$, $Zn^{++}$, anilino, toluidino, sec-butylamino, and ethylamino;

alkyl represents an alkane radical containing 14 to 18 carbon atoms, inclusive; and aryl represents an aromatic radical selected from the group consisting of o-tolyl, p-tolyl, o-ethyl phenyl, p-ethyl phenyl, o-n-propyl phenyl, and p-n-propyl phenyl.

9. The method of claim 8 wherein said M' alkyl aryl ether sulfonate is in a concentration of from 0.001 to 5.0 percent by weight of said active solution.

10. The method of claim 8 wherein said M' alkyl aryl ether sulfonate is in a concentration of from 0.01 to 1.0 percent by weight of said active solution.

11. The method of claim 8 wherein said M' alkyl aryl ether sulfonate is M' hexadecyl aryl ether sulfonate.

12. The method of claim 11 wherein said M' hexadecyl aryl ether sulfonate is M' hexadecyl o-tolyl ether sulfonate.

13. The method of claim 12 wherein said M' hexadecyl o-tolyl ether sulfonate is sec-butylamino hexadecyl o-tolyl ether sulfonate.

14. In a method for the recovery of oil from an oil-containing subterranean formation by injecting a flooding liquid through an injection well into said formation and producing oil from said formation through a production well, the improvement comprising injecting into said formation an active aqueous solution incorporating from 0.01 to 1.0 percent by weight of sodium hexadecyl o-tolyl ether sulfonate, and 0.01 to 2.0 percent by weight of sodium chloride.

15. In a method of recovering oil from an oil-containing subterranean formation by injecting a flooding liquid through an injection well into said formation and producing oil from said formation through a production well, the improvement comprising injecting into said formation an active aqueous solution incorporating sufficient quantity to convert said active aqueous solution into a surfactant, viscoelastic, shear hardening, positive non-simple liquid of at least one M dialkoxy benzene sulfonate having the structural formula:

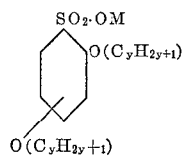

where

M represents a cation selected from the class consisting of $H^+$, $K^+$, $Na^+$, $NH_4^+$, $Cu^{++}$, $Zn^{++}$, anilino, toluidino, sec-butylamino, and ethylamino; and $y$ represents 7 to 9, inclusive.

16. The method of claim 15 wherein said active aqueous solution is injected as a slug of from 0.01 to 0.1 pore volume, displacing the oil and being displaced by a driving fluid therebehind.

17. The method of claim 16 wherein said driving fluid is water.

18. The method of claim 15 wherein said M dialkoxy benzene sulfonate contains alkoxy radicals joined in the 2,4 positions with respect to the sulfonate radical on the benzene ring.

19. The method of claim 15 wherein said M dialkoxy benzene sulfonate contains alkoxy radicals joined in the 2,5 positions with respect to the sulfonate radical on the benzene ring.

20. The method of claim 15 wherein said M dialkoxy benzene sulfonate is in a concentration of from 0.001 to 5.0 percent by weight.

21. The method of claim 15 wherein said M dialkoxy benzene sulfonate is in a concentration of from 0.01 to 1.0 percent by weight.

22. The method of claim 15 wherein said M dialkoxy benzene sulfonate is sec-butylamino dioctyloxy benzene sulfonate.

23. The method of claim 15 wherein said at least one M dialkoxy benzene sulfonate comprises a mixture of more than one of said M dialkoxy benzene sulfonates.

24. In a method of recovering oil from an oil-containing subterranean formation by injecting a flooding liquid through an injection well into said formation and producing oil from said formation through a production well, the improvement comprising injecting into said formation an active aqueous solution incorporating from 0.01 to 2.0 percent by weight of sodium chloride and from 0.01 to 1.0 percent by weight of at least one M dialkoxy benzene sulfonate selected from the class consisting of sodium 2,4-dioctyloxy benzene sulfonate and sodium 2,5-dioctyloxy benzene sulfonate.

25. The method of claim 24 wherein said at least one M dialkoxy benzene sulfonate comprises a mixture of sodium 2,4-dioctyloxy benzene sulfonate and sodium 2,5-dioctyloxy benzene sulfonate.

26. A method of recovering oil from an oil-containing subterranean formation having completed therein an injection means comprising at least one injection well and a production means comprising at least one production well, comprising the steps of:

(a) injecting through said injection means a slug of from 0.01 to 10 percent pore volume of water;

(b) injecting through said injection means a slug of from 0.01 to 1.0 percent pore volume of an aqueous solution containing from 0.1 to 1.7 percent by weight of a chelating agent selected from the class consisting of tetrasodium ethylenediaminetetraacetic acid and sodium phosphate glass;

(c) injecting through said injection means a slug of from 1 to 10 percent pore volume of an active aqueous solution comprising water having incorporated therein sufficient quantity of an additive to create a viscoelastic, shear hardening, positive non-simple liquid, said additive being selected from the class consisting of:
(1) M' alkyl aryl ether sulfonate,
where
M' represents a cation selected from the class consisting of $H^+$, $K^+$, $Na^+$, $NH_4^+$, $Zn^{++}$, anilino, toluidino, sec-butylamino, and ethylamino;
alkyl represents an alkane radical containing 14 to 18 carbon atoms, inclusive; and
aryl represents an aromatic radical selected from the class consisting of o-tolyl, p-tolyl, o-ethyl phenyl, p-ethyl phenyl, o-n-propyl phenyl, and n-propyl phenyl;
(2) copper alkoxy aryl sulfonate,
where
alkoxy represents a radical selected from the class consisting of tetradecyloxy, pentadecyloxy, heptadecyloxy, and octadecyloxy; and
aryl represents an aromatic radical selected from the class consisting of phenyl, tolyl, ethyl phenyl, and n-propyl phenyl;
(3) M dialkoxy benzene sulfonate,
where
M represents a cation selected from the class consisting of $H^+$, $K^+$, $Na^+$, $NH_4^+$, $Cu^{++}$, $Zn^{++}$, anilino, toluidino, sec-butylamino, and ethylamino; and
dialkoxy represents two radicals, each having an oxygen linkage on an alkyl radical containing 6 to 12 carbon atoms, inclusive, and together containing a total of 14 to 18 carbon atoms, inclusive; and
(4) M dialkoxy benzene disulfonate,
where
M represents a cation selected from the class consisting of $H^+$, $K^+$, $Na^+$, $NH_4^+$, $Cu^{++}$, $Zn^{++}$, anilino, toluidino, sec-butylamino, and ethylamino; and
dialkoxy represents two radicals, each having an oxygen linkage on an alkyl radical containing 14 to 20 carbon atoms, inclusive;
(d) injecting water into said injection means to drive said slugs of liquids of steps (a), (b), and (c) toward said production means; and
(e) producing the oil displaced from within said formation through said production means.

References Cited by the Examiner

UNITED STATES PATENTS

| | | | |
|---|---|---|---|
| 2,356,205 | 8/1944 | Blair et al. | 252—8.55 |
| 2,670,048 | 2/1954 | Menaul | 166—42 X |
| 3,126,952 | 3/1964 | Jones | 166—9 |
| 3,198,252 | 8/1965 | Walker et al. | 166—32 |
| 3,279,537 | 10/1966 | Kirk et al. | 166—9 |

References Cited by the Applicant

UNITED STATES PATENTS

| | | |
|---|---|---|
| 2,792,894 | 5/1957 | Graham et al. |
| 2,800,962 | 7/1957 | Garst. |
| 2,802,531 | 8/1957 | Cardwell et al. |
| 2,808,109 | 10/1957 | Kirk. |
| 2,811,207 | 10/1957 | Clark. |
| 2,839,466 | 6/1958 | Schock et al. |
| 2,852,077 | 9/1958 | Cocks. |
| 3,070,162 | 12/1962 | Barnard. |

OTHER REFERENCES

G. S. Hartley: "Sulfonates of Higher Alkyl Phenolic Ethers," Journal of Chemical Society, 1939, 1828–34.

H. N. Dunning and R. T. Johansen: "Laboratory Evaluation of Water Additives for Petroleum Displacement," Report of Investigation 5352, U.S. Department of the Interior, Bureau of Mines, July 1957.

CHARLES E. O'CONNELL, *Primary Examiner.*

S. J. NOVOSAD, *Assistant Examiner.*

UNITED STATES PATENT OFFICE
CERTIFICATE OF CORRECTION

Patent No. 3,315,744                                        April 25, 1967

Peggy M. Dunlap

It is hereby certified that error appears in the above numbered patent requiring correction and that the said Letters Patent should read as corrected below.

Column 2, line 3, for "metthod" read -- method --; column 8, line 18, for "hexyloxxy" read -- hexyloxy --; line 66, for the bottom portion of the formula reading $OR_6$                  read                  $OR_5$ column 9, line 9, for "sulfo-" read -- disulfo- --; line 24, for "2-octad-" read -- 2-octa- --; line 34, for "empircally" read -- empirically --; line 53, for "additives" read -- additive --; columns 11 and 12, in TABLE 1, third column, line 3 thereof, for "<1.0" read -- $\leq 1.0$ --; column 12, line 48, for "compartive" read -- comparative --; line 71, for "2,5-diactyloxy" read -- 2,5-dioctyloxy --; column 14, line line 46, for "o-n-propylphenyl" read -- o-n-propyl phenyl --; line 61, after "amino;" insert -- and --.

Signed and sealed this 14th day of November 1967.

(SEAL)
Attest:

EDWARD M. FLETCHER, JR.                          EDWARD J. BRENNER
Attesting Officer                                        Commissioner of Patents